Oct. 25, 1927.
C. M. FRYE ET AL
1,646,614
LIQUID HEATING AND DISPENSING MECHANISM
Original Filed June 2, 1925
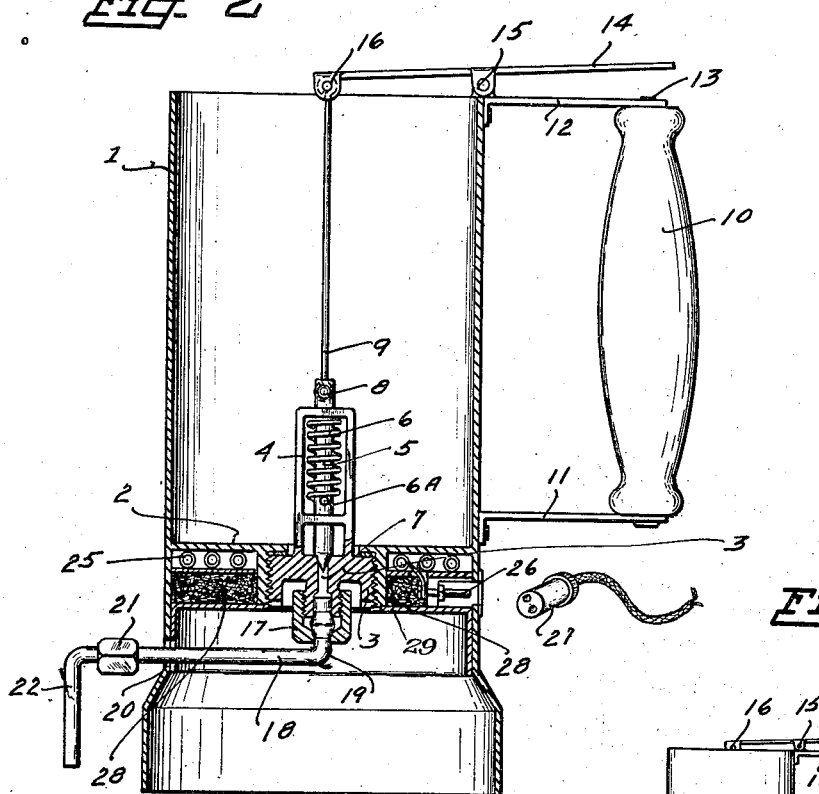
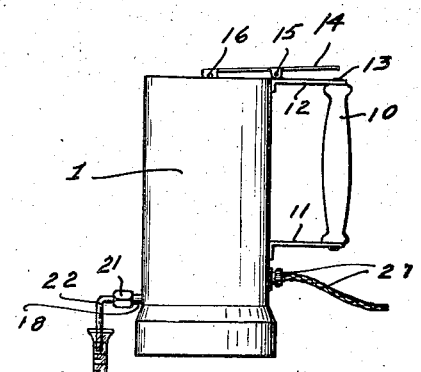
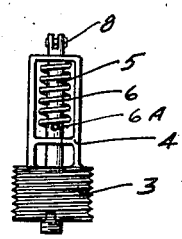
Inventors
Charles M. Frye
John F. Copp
By their
Attorney
Thomas Bilyeu Patented Oct. 25, 1927.

1,646,614

UNITED STATES PATENT OFFICE.

CHARLES M. FRYE, OF AMITY, OREGON, AND JOHN F. COPP, OF HAWTHORNE, CALIFORNIA.

LIQUID HEATING AND DISPENSING MECHANISM.

Application filed June 2, 1925, Serial No. 34,316. Renewed January 22, 1927.

Our invention relates to heating and dispensing mechanisms, wherein liquid, as water, or oil, or other fluids to be dispensed are placed within the dispensing mechanism and is maintained in the heated condition while the same is being dispensed, provision being made in the dispensing mechanism for the dispensing of the heated liquid in quantities desired by interposing of a needle valve at the outlet through the base of the same and adapted to being manipulated by a thumb actuator adjacent the handle supporting the same.

A further object consists in an adjustable threaded member at the outlet through the base adapted to maintain a tight joint and a removable outlet member which may be removed and replaced, to increase or decrease the diameter of the same, it being determined by the liquid to be dispensed therethrough.

Our invention is particularly adapted for use in creameries, milk condensers and other places where milk is being tested and wherein a device for filling the testing bottles having restricted graduated necks is required. In the filling operations but small quantities of the filling liquid are required in the final filling operations.

With these and incidental objects in view, the invention consists in certain novel features of construction and combination of parts, the essential elements of which are set forth in the appended claim and to a preferred form of embodiment of which is hereinafter shown with reference to the drawings which accompany and form a part of this specification.

In the drawings,—

Fig. 1 is a side elevation of our assembled device, shown in position for filling, a graduated necked bottle of the type used in the testing of milk for the butter fat content.

Fig. 2 is an enlarged sectional view of our device made to show the construction of the same and the heating elements for maintaining the liquid to be dispensed, in a heated condition, during the dispensing of the same.

Fig. 3 is a front view of the threaded valve stem carrying unit, shown removed from the device.

Like reference characters refer to like parts throughout the several views.

1 is the jacket of the dispensing mechanism having a bottom 2, disposed somewhat above the base of the same adapted to the reception of a threaded unit 3 therein. A frame structure 4, secured upon the bottom has a stem 5, of the needle valve type placed in suitable bearings for maintaining the same in alignment and having a compression spring 6, disposed therein adapted to maintain the needle valve in normally closed position. The cross pin 6ª disposed through the valve stem 5 is adapted to maintain the compression spring 6, normally under compression and to maintain the point of the needle valve in close contact with the passage way 7, and to prevent the liquid from escaping when the needle valve is closed. The needle valve stem 5 has a pin 8 in the upper end thereof, to which the link 9 is secured in hinged relation therewith. The jacket 1, has a handle member 10 disposed on the outer surface thereof and maintained in fixed position about the jacket by means of the brackets 11 and 12, the handle member being maintained in position about the pin 13, passing through the brackets. Disposed above the handle member is a thumb actuator 14, maintained in pivotal relation with the jacket by means of the pin 15 and having disposed on its inner end a pin 16, adapted to engage with the link 9. The compression spring 6, normally maintains the needle valve in closed position and the thumb actuator 14, in raised position and under substantial compression and when it is desired to dispense liquids from the container the device is held within the hand of the operator by grasping the handle 10 with the thumb upon the actuator 14, and in which position the thumb actuator may be manipulated. In the passage way 7, leading from the dispensing container, is a threaded nut 17, adapted for threaded engagement with the under side of the threaded unit 3, having a central passage way leading therefrom through which outlet pipe 18, on its upper end is adapted to extend, said pipe having a double tapered enlargement 19, disposed thereon adapted to engage upon its one side with the threaded nut 17, and on its other, with the passage way 7, so that as the threaded nut 17 is tightened, a tight joint is maintained between the tapered surface 19 and the passage way 7. The outlet pipe 18 passes through the jacket wall at 20 and having a union nut 21 disposed upon its outer end, to which the bent terminal tubing 22 is engaged. The terminal tubing 22, is adapted to be disengaged from the union 21, and to facilitate the placing therein of a terminal tube 22 adapted to fit within the narrow neck of the testing bottle 23, having a graduated neck 24, disposed thereupon. It will be necessary to change the size of this terminal tube 22, as the size or shape of the graduated neck of the bottle changes in size or shape. It is desirable to maintain the liquids to be dispensed from the container in heated condition and to accomplish this result, I have placed electric elements 25, within the base of the dispenser and disposed immediately below and in intimate relationship with the bottom 2 of the container, said heating elements being provided with terminals 26 into which the socket 27 is adapted to engage and to conduct electric current therein. Insulating materials 28, are disposed below the heating elements and are maintained in position through the false bottom 29, adapted to being secured to the case 1, of the dispenser through suitable fastening means.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What we claim is:—

A liquid heating and dispensing mechanism, comprising a container, a bracketed handle disposed parallel with the side wall and adjacent the top of the container, an opening central of the base of the container, a valve unit, having a central outlet, detachably mounted within said opening, a needle valve stem slidably mounted in said valve unit and adapted to close said central outlet, a compression spring placed about said needle valve stem and normally causing it to close the central outlet in the valve unit, means for moving the needle valve into and out of engagement with the central outlet, comprising a thumb actuator pivotally mounted on the upper edge of the container and above the handle and a link pivotally disposed between the inner end of said thumb actuator and the upper end of said needle valve stem; an outlet pipe, a threaded nut engaging with the underside of the valve unit, and securing the outlet pipe thereto, a terminal tube, a union securing the terminal tube to the outlet pipe; a false bottom disposed below and adjacent the bottom of the container, electric heating elements disposed within the space between the bottom of the container and the false bottom, socket terminals for said heating element, and insulating material disposed below and between the heating elements and the false bottom.

CHARLES M. FRYE.
JOHN F. COPP.